US010424133B2

(12) United States Patent
Raviram et al.

(10) Patent No.: US 10,424,133 B2
(45) Date of Patent: Sep. 24, 2019

(54) METHOD AND SYSTEM FOR GENERATING PROGNOSTIC INFORMATION REGARDING A COMPONENT IN A VEHICLE

(71) Applicant: GM GLOBAL TECHNOLOGY OPERATIONS LLC, Detroit, MI (US)

(72) Inventors: Sachin Raviram, Bengaluru (IN); Nathan D. Ampunan, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 325 days.

(21) Appl. No.: 15/626,616

(22) Filed: Jun. 19, 2017

(65) Prior Publication Data

US 2018/0365911 A1 Dec. 20, 2018

(51) Int. Cl.

*G07C 5/08* (2006.01)
*G07C 5/00* (2006.01)
*G01M 17/00* (2006.01)

(52) U.S. Cl.

CPC ........... *G07C 5/0808* (2013.01); *G07C 5/006* (2013.01); *G07C 5/008* (2013.01); *G07C 5/085* (2013.01); *G07C 5/0825* (2013.01)

(58) Field of Classification Search

CPC ...... G07C 5/006; G07C 5/008; G07C 5/0808; G07C 5/085; G01M 17/00
USPC .......................................................... 701/29.1
See application file for complete search history.

(56) References Cited

U.S. PATENT DOCUMENTS 6,119,074 A * 9/2000 Sarangapani ...... G05B 23/0232 701/1
6,941,202 B2 * 9/2005 Wilson .................. G01D 9/005 340/572.1
9,971,815 B2 * 5/2018 Merg .................... G07C 5/006

* cited by examiner

*Primary Examiner* — Tan Q Nguyen
(74) *Attorney, Agent, or Firm* — Reising Ethington, P.C.

(57) ABSTRACT

A method and system are provided for generating prognostic information regarding a component in a vehicle. The method includes receiving a first set of data for one or more parameters corresponding to the component. The first set of data is obtained from a degradation signal wirelessly transmitted from the vehicle at a first predetermined frequency. The method further includes executing, at a second predetermined frequency, a set of executable instructions for assessing a condition of the component in response to the first set of data. The method further includes obtaining a second set of data indicative of repair or replacement of the component and adjusting at least one of the first predetermined frequency and the second predetermined frequency responsive to the second set of data.

20 Claims, 2 Drawing Sheets

Figure 1:
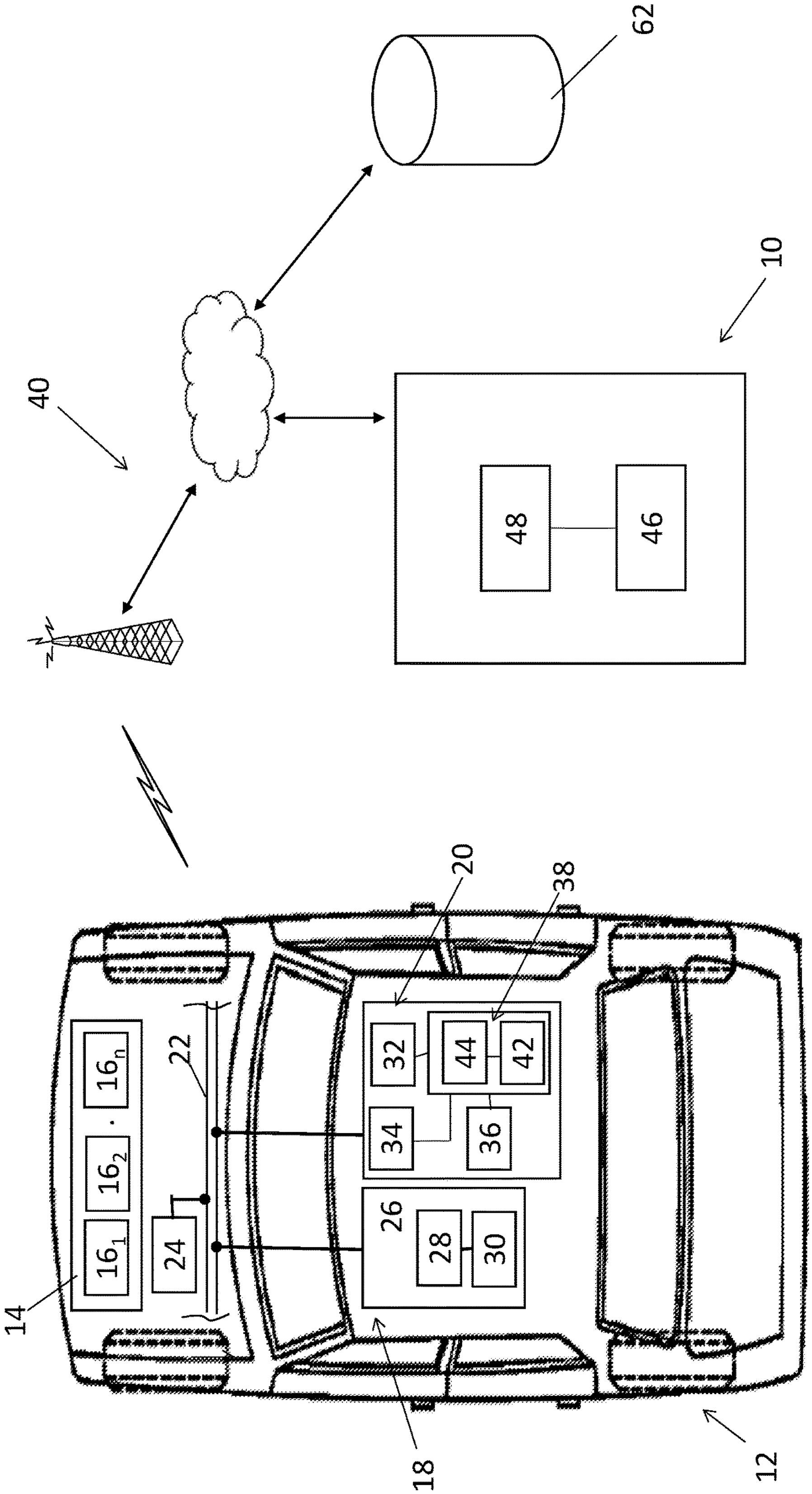

METHOD AND SYSTEM FOR GENERATING PROGNOSTIC INFORMATION REGARDING A COMPONENT IN A VEHICLE

FIELD

This disclosure relates generally to systems and methods for generating prognostic information regarding vehicle components. More specifically, the disclosure relates to a method and system for generating prognostic information regarding vehicle components in which frequency of data transmission from the vehicle and/or execution of prognostic algorithms is adjusted to account for repair or replacement of the components.

BACKGROUND

Conventional vehicles include on-board monitoring systems that continuously monitor vehicle systems and components to evaluate performance. The data generated by these monitoring systems can also be downloaded or transmitted to off-board diagnostic and prognostic systems that are used to diagnose and predict faults in the vehicle systems and components.

In conventional prognostic systems, the vehicle is configured to wirelessly transmit data regarding vehicle systems and components to a remote system executing a prognostic algorithm at a fixed frequency based on the passage of time or the occurrence of an event (e.g., starting the vehicle). The remote system is also configured to execute the prognostic algorithm at fixed frequency (and often, continuously). Transmitting data from the vehicle to the remote system, however, occupies valuable bandwidth within wireless communication channels that are handling ever increasing amounts of data relating to vehicle safety, navigation, and personal entertainment. Transmitting data from the vehicle to the remote system also incurs costs from wireless communication providers. Further, each execution of a prognostic algorithm on the remote system requires use of valuable processing and data storage resources.

SUMMARY

According to one embodiment, there is provided a system for generating prognostic information regarding a component in a vehicle. The system includes a memory configured to store a set of executable instructions assessing a condition of the component in response to a first set of data for one or more parameters corresponding to the component obtained from a degradation signal wirelessly transmitted from the vehicle at a first predetermined frequency. The system further includes a processor configured to execute, at a second predetermined frequency, the set of executable instructions. The processor is further configured to obtain a second set of data indicative of repair or replacement of the component and to adjust at least one of the first predetermined frequency and the second predetermined frequency responsive to the second set of data.

According to another embodiment, there is provided a system for generating prognostic information regarding a component in a vehicle. The system includes a memory configured to store a set of executable instructions assessing a condition of the component in response to a first set of data for one or more parameters corresponding to the component obtained from a degradation signal wirelessly transmitted from the vehicle at a first predetermined frequency. The system further includes a processor configured to execute, at a second predetermined frequency, the set of executable instructions. The processor is further configured to obtain a second set of data indicative of repair or replacement of the component from a database configured to retain maintenance records for a plurality of vehicles including the vehicle and to adjust at least one of the first predetermined frequency and the second predetermined frequency responsive to the second set of data.

According to another embodiment, there is provided a method for generating prognostic information regarding a component in a vehicle. The method includes the step of receiving a first set of data for one or more parameters corresponding to the component. The first set of data is obtained from a degradation signal wirelessly transmitted from the vehicle at a first predetermined frequency. The method further includes the step of executing, at a second predetermined frequency, a set of executable instructions for assessing a condition of the component in response to the first set of data. The method further includes the steps of obtaining a second set of data indicative of repair or replacement of the component and adjusting at least one of the first predetermined frequency and the second predetermined frequency responsive to the second set of data.

DRAWINGS

Figure 2:
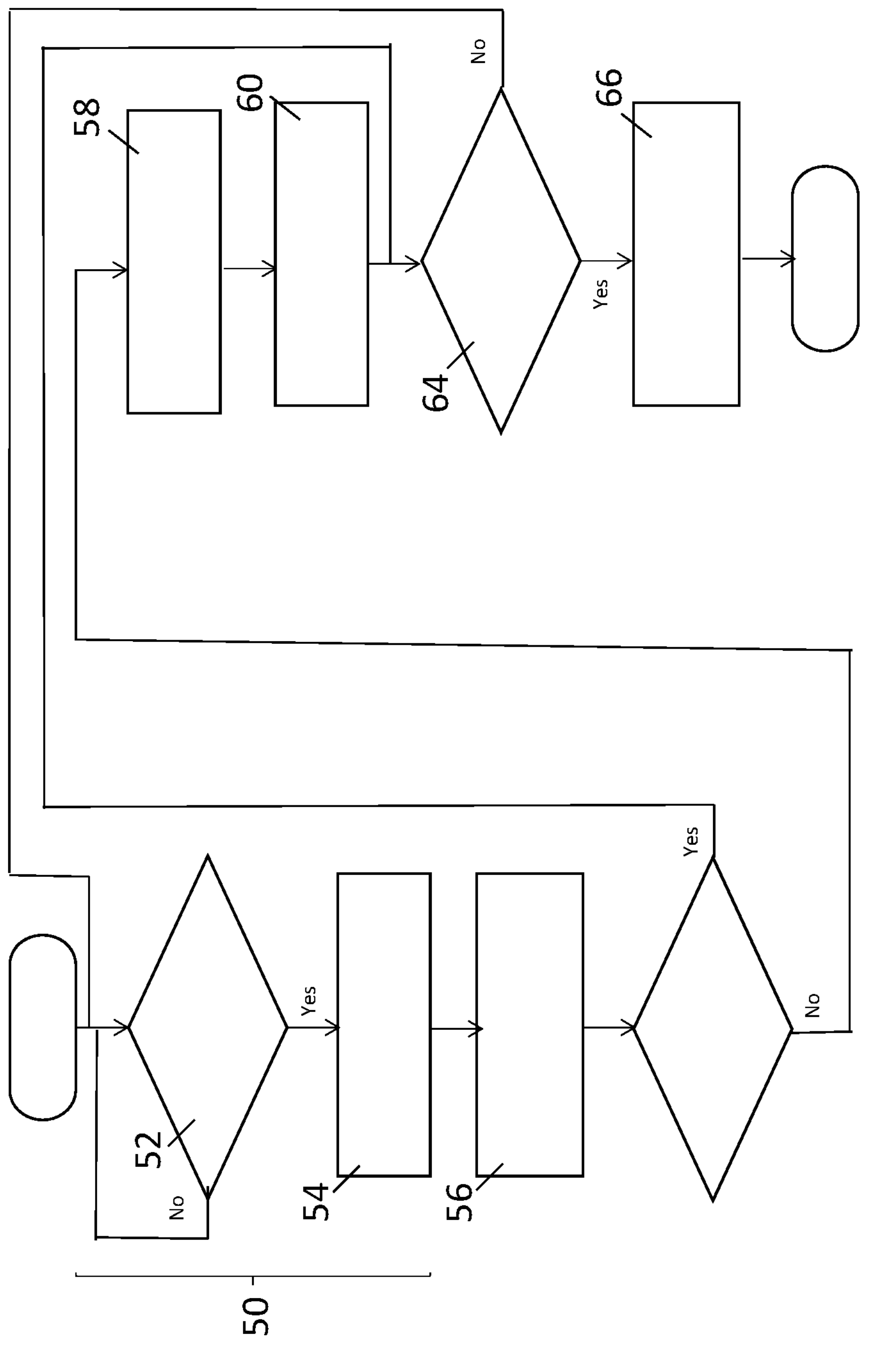

Preferred exemplary embodiments will hereinafter be described in conjunction with the appended drawings, wherein like designations denote like elements, and wherein:

FIG. 1 is a schematic view of one embodiment of a system for generating prognostic information regarding a component in a vehicle; and, FIG. 2 is a flowchart illustrating embodiments of a method for generating prognostic information regarding a component in a vehicle.

DESCRIPTION

The system and method described herein may be used to reduce one or both of the frequency of execution of a prognostic algorithm for a vehicle component or the frequency of transmission of data regarding the component from the vehicle to a remote prognostic system whenever the component has recently been repaired or replaced and is, therefore, likely to be functioning properly/optimally. As a result, wireless bandwidth is preserved for other uses and data transmission costs may be reduced. Further, processing and data storage resources are preserved for other uses.

Referring now to the drawings wherein like reference numerals are used to identify identical components in the various views, FIG. 1 illustrates one embodiment of a system 10 for generating prognostic information regarding one or more components in a vehicle 12. Although a single vehicle 12 is illustrated in FIG. 1, it should be understood that system 10 may generate prognostic information regarding components from multiple vehicles.

Vehicle 12 includes various vehicle systems 14, each of which include one or more components 16. In accordance with certain aspects of the present disclosure, vehicle 12 may further includes a monitoring or diagnostic system 18 for monitoring the operation and performance of systems 14 and components $\mathbf{16}_1 \ldots \mathbf{16}_n$ and a telematics system 20.

Vehicle system 14 performs one or more functions associated with the operation of vehicle 12 or a portion of vehicle 12. System 14 may therefore comprise any of a wide variety of common vehicle systems. In one embodiment system 14, may comprise a battery system for vehicle 12 and system 10 may be configured to provide prognostic information regarding a component 16 of the battery system such as the expected life of the vehicle battery. In another embodiment system 14 may comprise a fuel system and system 10 may be configured to provide a prognosis regarding a component 16 of the fuel system such as the expected life of a fuel pump. In another embodiment system 14 may comprise an ignition system for vehicle 12 and system 10 may be configured to provide prognostic information regarding a component 16 of the ignition system such as the expected life of the starter motor. It should be understood that the systems described above are exemplary only and that system 10 could be configured to provide prognostic information regarding components found in a wide variety of vehicle systems 14 including engines, braking systems, steering systems, climate control systems, collision avoidance systems, access control systems, etc. It should also be understood that the term component may refer to a wide variety of mechanical, electrical or electro-mechanical components within vehicle 10 and subparts thereof including sensors, circuits, controllers and modules.

Monitoring or diagnostic system 18 is provide to assess the operation and performance of one or more vehicle systems 14 and/or components of systems 14. System 18 may include electronic hardware components that receive input from one or more sensors, cameras, wireless communications devices (handling communications between vehicle 12 and remote servers, other vehicles, and other nearby wireless communication devices) and use the inputs to perform diagnostic, monitoring, reporting and/or other functions. Each system 18 is preferably connected to a communications bus 22 to other systems within vehicle 12 including telematics system 20 and can be programmed to run vehicle system and subsystem diagnostic tests. Information obtained by, or generated by, system 18 may be made available to occupants of vehicle 12 through visual, audio, haptic, or other interfaces and may be stored by system 18 for retrieval by, for example, a vehicle service technician. System 18 may be configured to generate a standardized series of diagnostic trouble codes (DTCs) that allow a technician to rapidly identify and remedy malfunctions within the vehicle. In accordance with the present disclosure, the information generated by system 18 may also be transmitted by vehicle 12 to system 10 for use by system 10. System 18 may include one or more sensors 24 and a controller 26.

Sensors 24 are provided to detect various conditions associated with systems 14 and components 16 and to measure values for parameters associated with systems 14 and components 16. In the case of a battery system, for example, sensors 24 may monitor conditions or measure parameters such as battery temperature, battery voltage, battery current, battery state of charge (SOC), battery state of health (SOH), battery state of function, etc. Sensors 24 may form a part of one or more vehicle systems 14 in addition to forming a part of monitoring system 18. In the case of a battery system, for example, sensors 24 may also output signals to a battery controller having information relating to pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Controller 26 is provided to assess the operation and performance of system 14 responsive to the signals generated by sensors 24 and other information (e.g., information relating to age of components 16 as indicated by system clocks within vehicle 12). It should be understood that controller 26 may render its assessment based on information generated by sensors 24 that are directly associated with a particular system 14 or component 16, but may also rely on information generated by sensors 24 that are associated with other systems 14 and components 16 where the performance of various systems 14 and components 16 are interrelated. In the case of a battery system, for example, the improper operation of vehicle accessories drawing power from the battery may impact the performance of the battery system and the monitoring system 18 for the battery system may therefore assess the condition of the battery by incorporating information regarding the performance of vehicle accessories. In accordance with one aspect of the present teachings, controller 26 generates a degradation signal that contains a set of data for one or more parameters corresponding to a component 16. In the case of a battery of a battery system, for example, the degradation signal may include data representing sensed values for battery temperature, voltage and/or current. The data (or degradation signature) in the degradation signal characterizes and quantifies the level of degradation of component 16 and may be represented as a scaled number, vector, graph or other representation. The data may be absolute or relative to other values such as degradation thresholds or ideal values. Controller 26 generates the degradation signal at a predetermined frequency based on a time-based or event-based condition. In the case of a time-based condition, controller 26 generates the degradation signal on a periodic schedule based on the passage of time (e.g., every twenty-four hours). In the case of an event-based condition, controller 26 generates the degradation signal responsive to occurrence of the event (e.g., each time a vehicle is started or every n times a vehicle is started). As discussed in greater detail below vehicle 10 may transmit the degradation signal to system 10 through telematics system 20. Controller 26 may include a memory device 28 and a processing device 30. Memory device 28 may include any type of suitable electronic memory means and may store a variety of data and information. This includes, for example: sensed conditions and parameter values; look-up tables and other data structures; software, firmware, programs, algorithms, scripts, and other electronic instructions; component characteristics and background information, etc. Processing device 30 may include any type of suitable electronic processor (e.g., a microprocessor, a microcontroller, an application specific integrated circuit (ASIC), etc.) that executes instructions for software, firmware, programs, algorithms, scripts, etc. and is not limited to any one type of component or device. Controller 26 may be electronically connected to other vehicle systems and controllers via I/O devices and suitable connections such as bus 22, so that they can interact as required. Depending on the particular embodiment, controller 26 may be a stand-alone electronic module, it may be incorporated or included within another electronic module in the vehicle, or it may be part of a larger network or system (e.g., a battery management system (BMS)).

Telematics system 20 can be an OEM-installed (embedded) or aftermarket device that is installed in vehicle 12 and that enables wireless voice and/or data communication over a wireless carrier system and via wireless networking. System 20 may enable communication between vehicle 12 and system 10. System 20 may also enable communication between vehicle 12 and a call center, other telematics-enabled vehicles, or some other entity or device. System 20 can therefore be used to provide a diverse range of vehicle services that involve wireless communication to and/or from the vehicle 12. Such services include: turn-by-turn directions and other navigation-related services that are provided in conjunction with a GPS-based vehicle navigation system; airbag deployment or collision notification and other emergency or roadside assistance-related services that are provided in response to signals received from various vehicle control modules; and infotainment-related services where music, webpages, movies, television programs, videogames and/or other information is downloaded by an infotainment system and is stored for current or later playback. Of particular relevance to the present invention, such services may also include diagnostic reporting using information obtained from vehicle control systems or diagnostic systems such as system 18. The above-listed services are by no means an exhaustive list of all of the capabilities of telematics system 20, but are simply an enumeration of some of the services that telematics system 20 is capable of offering. System 20 may include a user interface 32, a network communication module 34, a wireless communication module 36, and a controller 38. System 20 may further include other components such as a GPS receiver for use in vehicle navigation.

User interface 32 enables vehicle occupants to access or initiate various services through telematics system 20 and to provide and receive information from a call center, other telematics-enabled vehicles or other entity or device. Interface 32 may include any combination of hardware, software and/or other components that enable a vehicle occupant to exchange information or data through system 20. The interface 32 may therefore include input components such as a microphone, one or more pushbuttons, a touch-screen display or other input device where user interface 32 receives information from a vehicle occupant, as well as output components like an audio system, a visual display, or an instrument panel, where user interface 32 provides information to the vehicle occupants. Some or all components of user interface 32 may be mounted in various locations in the vehicle including an instrument panel, center stack console, or on the vehicle's rear view mirror.

Network communication module 34 includes a network interface configured for connection to a telecommunications network 40. Network 40 may comprise the public internet, a local area network (LAN), wide area network (WAN), virtual private network (VPN) or other form of telecommunications network. Network 40 may include a wireless carrier system such as a cellular telephone system implementing analog communications technologies such as AMPS or digital communications technologies such as CDMA (e.g., CDMA2000) or GSM/GPRS. As an alternative or in addition, the wireless carrier system may comprise a satellite communication system that provides uni-directional and bi-directional communication with the vehicle 10. Using the wireless carrier network, telematics system 20 may be connected to wired communications networks and to remote computing devices including, for example, service center computers where diagnostic information and other vehicle data can be uploaded from the vehicle via the telematics system 20, client computers used by the vehicle owner or other subscriber for such purposes as accessing or receiving vehicle data or to setting up or configuring subscriber preferences or controlling vehicle functions, file servers to or from which vehicle data or other information is provided, web servers, or network address servers. In accordance with aspects of the present teachings, the remote computing devices may include devices forming part of system 10 for generating prognostic information regarding components 16 in vehicle 12.

Wireless communication module 36 is configured for short range wireless communication with short range wireless communication devices used in or near vehicle 12 including embedded vehicle systems and mobile communication devices carried by users of vehicle 12 such as key fobs, cellular phones (including smart phones) and portable computing devices that are not mechanically connected to vehicle 12 and are configured for wireless communication with module 36. Module 36 may communicate signals from short range wireless mobile communication devices to various vehicle systems (e.g., door locks or remote starting systems) for use in controlling those systems from the mobile communications devices. Module 36 also permits embedded vehicle systems and mobile communications devices to access telecommunications network 40 via network communication module 34. In this manner, telematics system 20 may function as a wireless access point within vehicle 10 (i.e. a hotspot) for certain vehicle systems and mobile communications devices to access network 40. Module 36 may include any combination of hardware, software and/or other components that enable wireless voice and/or data communication between module 36 and short range wireless communication devices and, in particular, may include a wireless interface having a radio transceiver configured for short range wireless communication with mobile communications devices over an antenna using short-range wireless technologies such as Wi-Fi (IEEE 802.11), WiMAX, Wi-Fi direct, Bluetooth, Zigbee, near field communication (NFC), etc.

Controller 38 is provided to control and manage communications among interfaces 34, 36, vehicle communications bus 22 and potentially dedicated hardwired connections within vehicle 12. Controller 38 may include a variety of electronic processing devices, memory devices, input/output (I/O) devices, and/or other known components, and may perform various control and/or communication related functions. In an exemplary embodiment, controller 38 includes an electronic memory device 42 that stores various look up tables or other data structures and software programs, etc. Controller 38 may also include an electronic processing device 44 (e.g., a microprocessor, a microcontroller, an application specific integrated circuit (ASIC), etc.) that executes instructions for software, firmware, programs, algorithms, scripts, etc. that are stored in memory device 42. Controller 44 may be a dedicated controller used only for telematics system 20 or can be shared with other vehicle systems. Controller 38 may be electronically connected to other vehicle devices, modules and systems via vehicle communications bus 22 or other communication means and can interact with them when required.

System 10 is configured to receive the degradation signal or signals generated by vehicle 12 through telematics system 20 and to generate prognostic information regarding components in vehicle 12 in response. System 10 may be implemented on any of a wide variety of computing devices. As used herein, the term "computing device" is intended to refer to any machine that is configured to process data or information in accordance with a set of executable instructions including, for example, servers or similar devices. As used herein, the term "server" refers to a computing device coupled to a telecommunications network such as network 40 and configured by programming instructions (i.e., software) to provide services to other computing devices (including other servers). System 10 may further comprise a combination of two or more computing devices. In accordance with various aspects of the present teachings, system 10 may include a memory 46 and a processor 48 and may be programmed in a conventional manner with various executable instructions (i.e. software) to perform a variety of tasks. In various embodiments, system 10 may further include one more input/output devices such as a keyboard, mouse, touch screen, and/or display/monitor. System 10 is configured for connection to vehicle 12 and, in particular, to telematics system 20 of vehicle 12 over network 40 and may therefore include a conventional wired or wireless network interface.

Memory 46 is provided to store executable program instructions used by processor 48 to execute various prognostic algorithms and generate prognostic information regarding components 16 in vehicle 12. In particular, memory 46 stores one or more sets of executable instructions for assessing the condition of one or more components 16 of vehicle 12. Upon execution of the instructions, processor 48 is able to assess the condition of a particular component 16 using data for one or more parameters corresponding to the component 16 that is obtained from the degradation signal relating to that component 16 transmitted from vehicle 12. It should be understood that the particular prognostic algorithm implemented by the set of instructions will vary based on a number of factors including the type of component 16 being assessed. In some embodiments, the set of instructions may compare the change or rate of change in one or more parameters over time. In some embodiments, the set of instructions may compare the current values of one or more parameters to threshold values indicative of potential wear, malfunction or other problems particular to a given component 16. Memory 46 may further be configured to store information used during execution of the prognostic algorithms including data extracted from the degradation signal and information relating to the assessment of the component 16 following execution of the prognostic algorithm. Memory 46 may include any type of suitable electronic memory means and may be used to store a variety of instructions, data and information beyond the program instructions and data referenced above. The instructions, data and information may be stored in conventional data structures such as record and look-up tables.

Processor 48 is provided to execute the program instructions for various prognostic algorithms used in generating prognostic information regarding components 16 in vehicle 12. In accordance with the present teachings, processor 48 is also provided to adjust the frequency of execution of those algorithms and/or the frequency of transmission of the degradation signals from vehicle 12 based on certain conditions. Processor 48 may include any type of suitable electronic processor (e.g., a microprocessor, a microcontroller, an application specific integrated circuit (ASIC), etc.) that executes instructions for software, firmware, programs, algorithms, scripts, etc.

In accordance with the present invention, processor 48 may be configured (encoded) with programming instructions or code (i.e. software) to perform various steps in a method for generating prognostic information for a component 16 of vehicle 12. This code may be stored in memory 46 and may be uploaded to memory 46 from a conventional computer storage medium. Referring now to FIG. 2, the method may begin with the step 50 of receiving a set of data for one or more parameters corresponding to a component 16 of vehicle 12. Step 50 may include the substep 52 of receiving a degradation signal wirelessly transmitted from vehicle 12. As discussed hereinabove, controller 18 may be configured to generate a degradation signal indicative of a condition of component 16 of vehicle 12 at a predetermined frequency using information obtained from sensors 24 and other sources. Monitoring system 18 may transmit the signal to system 10 using telematics system 20 on vehicle 12 and telecommunications network 40. Step 50 may further include the substep 54 of extracting the data for the parameters relating to component 16 from the degradation signal. The degradation signal may have a predetermined format (including, for example, headers, addresses, and payload/data) and processor 48 may be configured to recognize the format and access and extract the relevant data from the signal.

The method may continue with the step 56 of executing a set of executable instructions for assessing a condition of the component in response to the data obtained from the degradation signal. As discussed above, these instructions may be stored in memory 46 which may store sets of instructions for implementing various prognostic algorithms. Processor 48 may execute the instructions in a conventional manner. In accordance with one aspect of the present teachings, processor 48 is configured to execute the set of instructions at a predetermined frequency. In the illustrated embodiment, step 56 is shown as occurring subsequent to step 50 because performance of step 56 may require data relating to the component 16 before step 50 can be performed. It should be understood, however, that step 56 is not necessarily triggered by the performance of step 50. Rather, processor 48 may be configured to perform step 56 at a predetermined frequency using whatever data is available for the component 16 at the time step 56 is performed. Therefore, for example, processor 48 may repeat step 56 using the same data used in a prior iteration of step 56 where the data has not been updated because another degradation signal has not been received. Processor 48 may also be configured, in executing the instructions, to request additional information from system 18 or other systems in vehicle 12 to better assess the condition of a given component 16.

If the performance of step 56 indicates that the condition of component 16 meets a predetermined condition (e.g., is not functioning properly or its performance has degraded below a predetermined threshold), system 10 may be configured to perform various actions. In step 58, system 10 may be configured to generate a warning signal for transmission to vehicle 12 in order to alert the owner or occupants of vehicle 12 that action may be required with respect to component 16. The signal may be transmitted to vehicle 12 over network 40 through telematics system 20. The signal may be configured to cause generation of an audio, visual or haptic warning to occupants of the vehicle using conventional audio, visual or haptic interfaces within vehicle 12 (e.g., monitors/display, warning lights, speakers, etc.). In this manner, system 10 may generate a warning similar to warnings generated by the vehicle's on-board monitoring or diagnostic systems 18. System 10 differs from system 18, however, in that system 10 may be much more sophisticated. System 10 may, for example, assess the condition of component 16 using data obtained not only from vehicle 12, but from the performance history of similar vehicles or components. System 10 may also be updated more frequently than system 18. Accordingly, system 10 may be able to identify problems with a component before system 18 in certain circumstances. Further, system 10 is a prognostic system configured to identify future problems in order to provide the vehicle owner and occupants sufficient time to repair or replace a component before a problem arises. In addition to generating a warning signal for transmission to vehicle 12, system 10 may generate warning signals for delivery to computing devices that are not mechanically connected to vehicle 12 such as cellular phones. System 10 may also generate warning signals to third parties such as third party repair facilities who can then contact the vehicle owner.

In accordance with the present teachings, if the performance of step 56 indicates that the condition of component 16 meets a predetermined condition, system 10 may also be configured to perform the step 60 of periodically requesting data regarding vehicle 12 from a database 62 (FIG. 1) configured to retain maintenance records for a plurality of vehicles including vehicle 12. If performance of step 56 indicates that component 16 is not functioning properly or that its performance has degraded below a certain threshold, there is a reasonable likelihood that the owner of the vehicle 12 will eventually seek to repair or replace component 16 (whether as a direct result of a warning received from system 10 or system 18 or on the owner's own initiative as a result of sensing that the vehicle 12 is not running properly or as a part of routine maintenance or a desire to update vehicle 12). When the vehicle 12 is taken to a repair facility (e.g., a vehicle dealership repair facility or independent repair facility), the facility will typically generate an electronic record of the repair or replacement of the component 16—particularly in cases where the repair or replacement is made under a warranty claim relating to the component 16. These records may include, for example, standardized codes referencing components 16 and the type of action performed. Further, these records may be stored in a centralized database such as the Global Analysis and Reporting Tool (GART) maintained by General Motors Corporation. Processor 48 may be configured to periodically access database 62 in order to determine whether the component 16 has been repaired or replaced for a purpose discussed below.

The method may continue with the step 64 of obtaining a set of data indicative of the repair or replacement of component 16. In accordance with some embodiments, processor 48 may receive the data from database 62 as described above. The data may be requested by processor 48 or directed to processor 48 by another computing device. In other embodiments, processor 48 may be configured to extract the data from the degradation signal transmitted by vehicle 12. The signal may be configured to encode data indicative of the repair or replacement of component 16. This may be particularly useful where the owner of the vehicle elects to repair or replace component 16 without the use of a repair facility or by using a facility that does not report the repair or replacement to database 62. System 18 may be configured to detect the repair or replacement of component 16 (e.g. by detecting the absence and subsequent presence of component 16 or by detecting a significant improvement in one or more parameters associated with component 16) and to include data indicative of the repair or replacement in the degradation signal generated by system 18. Processor 48 may be configured to extract the data from the signal.

As referenced hereinabove, processor 48 may execute the set of executable instructions for assessing a condition of component 16 at a predetermined frequency. Further, vehicle 12 may generate and transmit the degradation signal indicative of the condition of component 16 at a predetermined frequency. Each execution of the instructions by processor 48 requires the use of processing and data storage resources that are often demanded by other processes. Each transmission of the degradation signal occupies bandwidth within wireless communication channels that are handling ever increasing amounts of data relating to vehicle safety, navigation, and personal entertainment and incurs costs from wireless communication providers. When a component 16 has recently been repaired or replaced, it is unlikely that the component 16 will need to be repaired or replaced again for a period of time. Therefore, when the data obtained in step 64 indicates that component 16 has been repaired or replaced, the method may continue with the step 66 of adjusting one or both of the predetermined frequency at which processor 48 executes the instructions for the prognostic algorithm (i.e., step 56) and the predetermined frequency at which vehicle 12 transmits the degradation signal. In particular, processor 48 may be configured to reduce one or both of the predetermined frequencies to save processing and data storage resources and/or wireless communication bandwidth and costs. Further, processor 48 may be configured reduce either frequency to zero to prevent execution of the instructions for the prognostic algorithm by processor 48 (i.e., step 56) or to prevent transmission of the degradation signal by vehicle 12. In embodiments where processor 48 is configured to adjust the predetermined frequency of transmission of the degradation signal, processor 48 may be configured to generate a control signal for transmission to vehicle 12. The signal may be transmitted to vehicle 12 over network 40 through telematics system 20 and delivered to monitoring system 18 over bus 22. Controller 26 of system 18 may be configured to receive the control signal and to adjust the frequency at which the degradation signal is generated, and subsequently transmitted, to system 10. The control signal may direct controller 26 to adjust the frequency by either lengthening the interval between transmissions or decreasing a duty cycle at which the signal is provided.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for generating prognostic information regarding a component in a first vehicle, comprising:

a memory configured to store a set of executable instructions for assessing a condition of the component in response to a first set of data for one or more parameters corresponding to the component obtained from a degradation signal wirelessly transmitted from the first vehicle at a first predetermined frequency;

a processor configured to:

execute, at a second predetermined frequency, the set of executable instructions;

obtain a second set of data indicative of repair or replacement of the component; and, adjust at least one of the first predetermined frequency and the second predetermined frequency responsive to the second set of data.

2. The system of claim 1 wherein the processor is further configured, in adjusting the at least one of the first predetermined frequency and the second predetermined frequency, to reduce the at least one of the first predetermined frequency and the second predetermined frequency.

3. The system of claim 2 wherein the at least one of the first predetermined frequency and the second predetermined frequency comprises the first predetermined frequency and the processor is further configured, in reducing the at least one of the first predetermined frequency and the second predetermined frequency predetermined frequency to generate a control signal for transmission to the first vehicle, the control signal configured to prevent transmission of the degradation signal by the first vehicle.

4. The system of claim 2 wherein the at least one of the first predetermined frequency and the second predetermined frequency comprises the second predetermined frequency and the processor is further configured, in reducing the at least one of the first predetermined frequency and the second predetermined frequency to prevent execution of the set of executable instructions for a period of time.

5. The system of claim 1 wherein the at least one of the first predetermined frequency and the second predetermined frequency comprises the first predetermined frequency and the processor is further configured to generate a control signal for transmission to the first vehicle, the control signal configured to adjust the first predetermined frequency.

6. The system of claim 1 wherein the processor is further configured, in obtaining the second set of data, to extract the second set of data from the degradation signal.

7. The system of claim 1 wherein the processor is further configured to periodically request data regarding the first vehicle from a database configured to retain maintenance records for a plurality of vehicles including the first vehicle when execution of the set of executable instructions indicates that the condition of the component meets a predetermined condition.

8. A system for generating prognostic information regarding a component in a first vehicle, comprising:

a memory configured to store a set of executable instructions for assessing a condition of the component in response to a first set of data for one or more parameters corresponding to the component obtained from a degradation signal wirelessly transmitted from the first vehicle at a first predetermined frequency;

a processor configured to:

execute, at a second predetermined frequency, the set of executable instructions;

obtain a second set of data indicative of repair or replacement of the component from a database configured to retain maintenance records for a plurality of vehicles including the first vehicle; and, adjust at least one of the first predetermined frequency and the second predetermined frequency responsive to the second set of data.

9. The system of claim 8 wherein the processor is further configured, in adjusting the at least one of the first predetermined frequency and the second predetermined frequency, to reduce the at least one of the first predetermined frequency and the second predetermined frequency.

10. The system of claim 9 wherein the at least one of the first predetermined frequency and the second predetermined frequency comprises the first predetermined frequency and the processor is further configured, in reducing the at least one of the first predetermined frequency and the second predetermined frequency predetermined frequency to generate a control signal for transmission to the first vehicle, the control signal configured to prevent transmission of the degradation signal by the first vehicle.

11. The system of claim 9 wherein the at least one of the first predetermined frequency and the second predetermined frequency comprises the second predetermined frequency and the processor is further configured, in reducing the at least one of the first predetermined frequency and the second predetermined frequency to prevent execution of the set of executable instructions for a period of time.

12. The system of claim 8 wherein the at least one of the first predetermined frequency and the second predetermined frequency comprises the first predetermined frequency and the processor is further configured to generate a control signal for transmission to the first vehicle, the control signal configured to adjust the first predetermined frequency.

13. The system of claim 8 wherein the processor is further configured to periodically request data regarding the first vehicle from the database when execution of the set of executable instructions indicates that the condition of the component meets a predetermined condition.

14. A method for generating prognostic information regarding a component in a first vehicle, comprising the steps of:

receiving a first set of data for one or more parameters corresponding to the component, the first set of data obtained from a degradation signal wirelessly transmitted from the first vehicle at a first predetermined frequency;

executing, at a second predetermined frequency, a set of executable instructions for assessing a condition of the component in response to the first set of data;

obtaining a second set of data indicative of repair or replacement of the component; and, adjusting at least one of the first predetermined frequency and the second predetermined frequency responsive to the second set of data.

15. The method of claim 14 wherein the adjusting the at least one of the first predetermined frequency and the second predetermined frequency comprises reducing the at least one of the first predetermined frequency and the second predetermined frequency.

16. The method of claim 15 wherein the at least one of the first predetermined frequency and the second predetermined frequency comprises the first predetermined frequency and adjusting the at least one of the first predetermined frequency and the second predetermined frequency includes the substep of generating a control signal for transmission to the first vehicle, the control signal configured to prevent transmission of the degradation signal by the first vehicle.

17. The method of claim 15 wherein the at least one of the first predetermined frequency and the second predetermined frequency comprises the second predetermined frequency and reducing the at least one of the first predetermined frequency and the second predetermined frequency includes preventing execution of the set of executable instructions for a period of time.

18. The method of claim 14 wherein the obtaining the second set of data includes the substep of receiving the second set of data from a database configured to retain maintenance records for a plurality of vehicles including the first vehicle.

19. The method of claim 14 wherein obtaining the second set of data includes the substep of extracting the second set of data from the degradation signal.

20. The method of claim 14, further comprising the step of periodically requesting data regarding the first vehicle from a database configured to retain maintenance records for a plurality of vehicles including the first vehicle when execution of the set of executable instructions indicates that the condition of the component meets a predetermined condition.

* * * * *